United States Patent
Ono

(10) Patent No.: US 9,372,660 B2
(45) Date of Patent: Jun. 21, 2016

(54) DISPLAY CONTROLLING APPARATUS, METHOD OF CONTROLLING THE SAME, AND STORAGE MEDIUM

(71) Applicant: CANON KABUSHIKI KAISHA, Tokyo (JP)

(72) Inventor: Tachio Ono, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 179 days.

(21) Appl. No.: 14/258,672

(22) Filed: Apr. 22, 2014

(65) Prior Publication Data

US 2014/0313104 A1    Oct. 23, 2014

(30) Foreign Application Priority Data

Apr. 23, 2013  (JP) .................................. 2013-090788

(51) Int. Cl.
  *G09G 5/14* (2006.01)
  *G06F 3/14* (2006.01)
  *H04N 9/31* (2006.01)

(52) U.S. Cl.
  CPC ................ *G06F 3/1454* (2013.01); *G09G 5/14* (2013.01); *H04N 9/3179* (2013.01); *G09G 2340/12* (2013.01)

(58) Field of Classification Search
  CPC ..... G06F 3/1454; G09G 5/14; G09G 2340/12
  See application file for complete search history.

(56) References Cited

U.S. PATENT DOCUMENTS

| | | | | |
|---|---|---|---|---|
| 2004/0017394 A1* | 1/2004 | Adachi | ................. | G06F 3/1454 715/744 |
| 2004/0051744 A1* | 3/2004 | Fukui | .................... | G06F 1/1626 715/848 |
| 2006/0005142 A1* | 1/2006 | Karstens | ............... | G06F 3/0481 715/767 |
| 2007/0182728 A1* | 8/2007 | Fujimori | ............... | G06F 3/1423 345/204 |
| 2008/0068290 A1* | 3/2008 | Muklashy | ............. | G06F 3/1423 345/2.1 |
| 2011/0029915 A1* | 2/2011 | Harris | ................... | G06F 3/1423 715/781 |

FOREIGN PATENT DOCUMENTS

| | | |
|---|---|---|
| JP | 2004-259163 A | 9/2004 |
| JP | 2006-106158 A | 4/2006 |

* cited by examiner

*Primary Examiner* — Ariel Balaoing
(74) *Attorney, Agent, or Firm* — Cowan, Liebowitz & Latman, P.C.

(57) ABSTRACT

A display controlling apparatus captures a displayed object, and selects a transmission object to transmit to an image outputting apparatus from objects which are display targets. The display controlling apparatus controls so that in a case where it is determined that the transmission object is an image output target, the transmission object is displayed with preference over another object. Also, the display controlling apparatus captures a transmission object after the control.

13 Claims, 6 Drawing Sheets

DISPLAY CONTROLLING APPARATUS, METHOD OF CONTROLLING THE SAME, AND STORAGE MEDIUM

BACKGROUND OF THE INVENTION

1. Field of the Invention

The present invention relates to a display controlling apparatus, the method of controlling the same and a storage medium, and particularly to a technique for presenting by transmitting a predetermined region of a displayed screen to an external display apparatus.

2. Description of the Related Art

Conventionally, there are techniques for performing image presentation to a user by obtaining (capture) a displayed screen of an information processing apparatus such as a PC as an image, and transmitting it to an image outputting apparatus such as a liquid-crystal projector through a network (Japanese Patent Laid-Open No 2006-106158). Also, in Japanese Patent Laid-Open No. 2004-259163, a technique is disclosed for obtaining only an image corresponding to a particular window included in a displayed screen by a capture, and transmitting it to an image outputting apparatus.

However, in cases where, as in Japanese Patent Laid-Open No. 2004-259163, only an image corresponding to a particular window is obtained, and transmitted to an image outputting apparatus, when another window, for example, overlaps the particular window in the displayed screen, the image corresponding to the particular window cannot be transmitted suitably. In other words, the image corresponding to the other window is included in the image corresponding to the particular window, and it is only possible to capture an image in which information of a portion of the region of the particular window is missing.

SUMMARY OF THE INVENTION

The present invention was made in view of such problems in the conventional technique. The present invention provides a display controlling apparatus, a method of controlling the same and a storage medium for suitably capturing, and transmitting, an image for and object of a portion within a displayed screen.

According to one aspect of the present invention, there is provided a display controlling apparatus, comprising: a capturing unit configured to capture an object which is being displayed on a display unit; a transmission unit configured to transmit, to an image outputting apparatus, the object captured by the capturing unit; a selection unit configured to select a transmission object to be transmitted to the image outputting apparatus from objects that are display targets for the display unit; a determination unit configured to determine whether the transmission object is an output target of the image outputting apparatus; and a control unit configured to control so that in a case where the determination unit determines that the transmission object is an output target of the image outputting apparatus, the transmission object is displayed with preference over another object displayed in the display unit, wherein the capturing unit captures the transmission object after the control by the control unit.

According to another aspect of the present invention, there is provided a method of controlling a display controlling apparatus, comprising: capturing an object which is being displayed on a display unit; transmitting, to an image outputting apparatus, the captured object; selecting a transmission object to be transmitted to the image outputting apparatus from objects that are display targets for the display unit; determining whether the transmission object is an output target of the image outputting apparatus; and controlling so that in a case where the determination unit determines that the transmission object is an output target of the image outputting apparatus, the transmission object is displayed with preference over another object displayed in the display unit, wherein a capture of the transmission object is performed after the controlling.

Further features of the present invention will become apparent from the following description of exemplary embodiments (with reference to the attached drawings).

DESCRIPTION OF THE EMBODIMENTS

Exemplary embodiments of the present invention will be described hereinafter in detail, with reference to the accompanying drawings. Note, for the embodiments explained below, explanation will be given for an example in which a PC will be applied to the present invention as an example of the display controlling apparatus, and a liquid-crystal projector will be applied to the present invention as an example of the image outputting apparatus for an image presentation system in which an image outputting apparatus presents images transmitted from a display controlling apparatus. However, the present invention can be adopted to any devices if there is a configuration in which an image outputting apparatus presents images transmitted from a display controlling apparatus.

<Image Presentation System Configuration>

Figure 1:
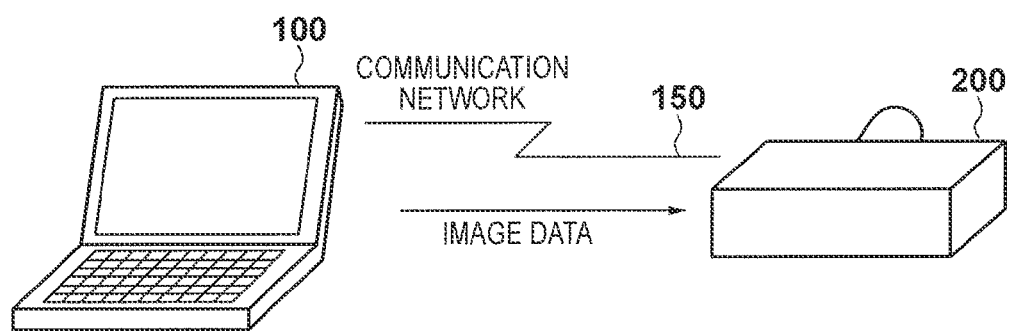
FIG. 1 is a view for showing a system configuration of an image presentation system according to embodiments of the present invention.

FIG. 1 is a view for showing a configuration of an image presentation system according to embodiments of the present invention.

As shown in the figure, in this embodiment, the image data generated in a PC 100 is transmitted to a liquid-crystal projector 200 through a communication network 150. Then, the liquid-crystal projector 200 presents an image to a user by projecting the image data onto a projection plane (not shown). The communication network 150 may be a wired network having Ethernet™ cable as defined by IEEE 802.3, a wireless network as defined by IEEE 802.11, or the like. However, the communication network of the communication network. 150 is not limited to this, and other digital communication connection methods may also be taken.

<Functional Configuration of the PC 100 and the Liquid-Crystal Projector 200>

Figure 2:
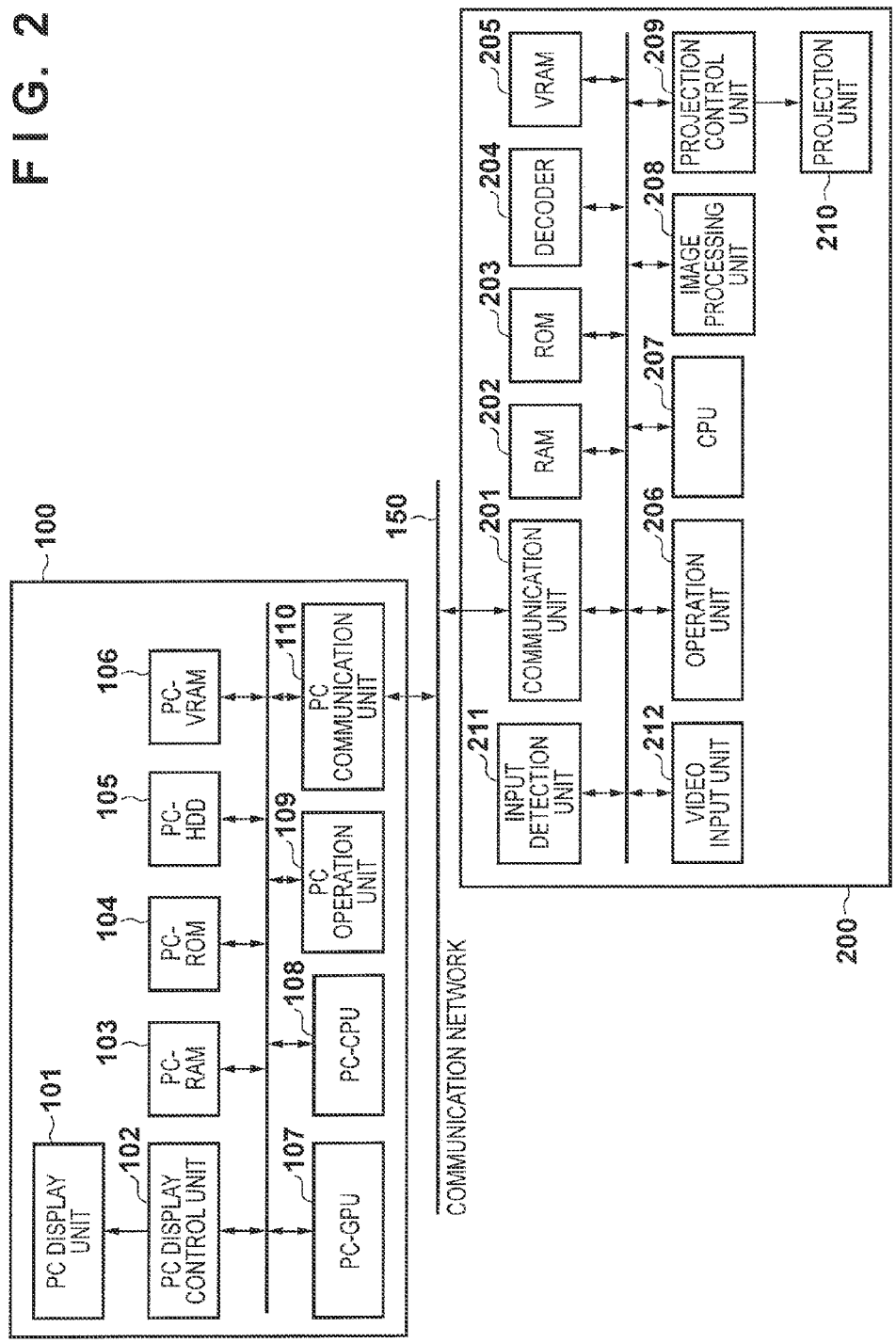
FIG. 2 is a block diagram for showing a functional configuration of a PC 100 and a liquid-crystal projector 200 according to embodiments of the present invention.

FIG. 2 is a block diagram for showing a functional configuration of the PC 100 and the liquid-crystal projector 200 according to embodiments of the present invention. Note, in this embodiment, to make clear which apparatus each constituent element belongs to, the prefix "PC" will be prepended to blocks that the PC 100 comprises.

A PC-CPU 108 controls operation of the blocks that the PC 100 comprises. Specifically, the PC-CPU 108 controls the operation of the blocks by reading out operation programs and application programs for the blocks stored in a PC-ROM 104 or a PC-HDD 105, loading them into a PC-RAM 103, and executing them.

The PC-ROM 104 is a rewritable, non-volatile memory, for example. The PC-ROM 104 stores parameters necessary for the operation of the blocks in addition to operation programs of the blocks that the PC 100 comprises. Also, the PC-HDD 105 is a storage apparatus connected detachably to the PC 100. The PC-HDD 105 stores an OS (operating system) for controlling the operation of the PC 100 as a whole, in addition to the operation programs and the application programs of the blocks. Also, the PC-RAM 103 is a volatile memory. The PC-RAM 103 is not only used as a loading area for the programs, but it also stores intermediate data output in the operation of the blocks. In this embodiment, the PC-RAM 103 is used as a storage area for storing temporarily image data transmitted to the liquid-crystal projector 200.

A PC display unit 101 is a display apparatus such as an LCD, for example, connected to the PC 100. The PC display unit 101 may be an element configured to be built into the PC 100, or it may be an external apparatus connected detachably to the PC 100. Display control for images displayed on a display area of the PC display unit 101 is performed by a PC display controller 102. Also, generation of display images displayed on the display area of the PC display unit 101 is performed by a PC-CPU 107. Specifically, the PC-GPU 107 reads out GUI data stored in the PC-HDD 105, for example, loads it into an embedded GPU memory, and renders display images into a PC-VRAM 106 in accordance with information for screen formation. Note, information for image forming is information of positions and sizes of windows in the display area, for example, and information necessary for rendering objects included in the display area, such as above/below relationships between windows, or the like. In this embodiment, information for screen formation will be explained as information obtainable using functions of the OS, but it should be easy to see that it is generatable by other management approaches that do not employ the functions of the OS.

A PC operation unit 109 is a user interface such as a mouse, a keyboard, or the like, for example, that the PC 100 comprises. The PC operation unit 109 transmits corresponding control signals to the PC-CPU 108 when it detects operation input performed by a user.

A PC communication unit 110 is a communication interface that the PC 100 comprises. In this embodiment, the PC 100 is capable of making a communication connection with the liquid-crystal projector 200 through the PC communication unit 110 and the communication network 150. The PC communication unit 110 encodes image data to transmit to the liquid crystal projector 200 with an encoding unit (not shown) and transmits it.

A CPU 207 controls operation of the blocks that the liquid-crystal projector 200 comprises. Specifically, the CPU 207 controls operation of the blocks by reading out operation programs of the blocks stored in a ROM 203, loading them into a RAM 202, and executing them.

The ROM 203 is a rewritable, non-volatile memory, for example. The ROM 203 stores parameters necessary for the operation of the blocks in addition to operation programs of the blocks that the liquid-crystal projector 200 comprises. Also, the RAM 202 is a volatile memory. The RAM 202 is not only used as a loading area for the programs, but it also stores intermediate data output in the operation of the blocks.

A communication unit 201 is a communication interface that the liquid-crystal projector 200 comprises. In this embodiment, the liquid-crystal projector 200 is capable of making a communication connection with the PC 100 through the communication unit 201 and the communication network 150. The communication unit 201 receives image data transmitted from the PC 100 in cases where a mode for projecting an input signal from an apparatus making a communication connection is set for the liquid-crystal projector 200. Meanwhile, a video input unit 212 is an image input interface that the liquid-crystal projector 200 comprises. In this embodiment, the video input unit 212 receives baseband video input, such as HDMI (trademark), DVI, or VGA, from an input apparatus connected to the video input unit 212. Regarding this video input, the input may be set to be received in cases where a mode for projecting an input signal from an apparatus connected to the video input unit 212 is set in the liquid-crystal projector 200. Note, mode selection as to which of the interfaces to project an input signal for is managed by an input detection unit 211. The input detection unit 211 may monitor for manual input by a user, monitor signal input statuses of an interfaces, and manage which the mode is selected. The liquid-crystal projector 200 of this embodiment is something that transmits information indicating that a mode is set for projecting an input signal from an apparatus making a communication connection to the PC 100 through the communication unit 201.

A decoder 204 performs decoding processing on image data received by the communication unit 201. Image data decoded by the decoder 204 are loaded into a VRAM 205. Also, an image processing unit 208 applies image processing for the projection to image data loaded into the VRAM 205. The image data for projection generated in this way are projected onto a projection plane using a projection unit 210 by a projection control unit 209.

An operation unit 206 is a user interface that the liquid-crystal projector 200 comprises such as a signal receiving unit for receiving infrared signals transmitted from a remote control comprising a power button, menu buttons, and the like, for example, or input buttons for operation of the liquid-crystal projector 200 The operation unit 206 outputs corresponding control signals to the CPU 207 when it detects operation input performed by a user.

Note, in this embodiment, explanation is given having the processing in each block that the PC 100 and the liquid-crystal projector 200 are provided with be realized as hardware, but working of the present invention is not limited to this, and the processing of the blocks may be realized by a program for performing similar processing to the blocks.

<Projection Image Transmission Processing>

Figure 3:
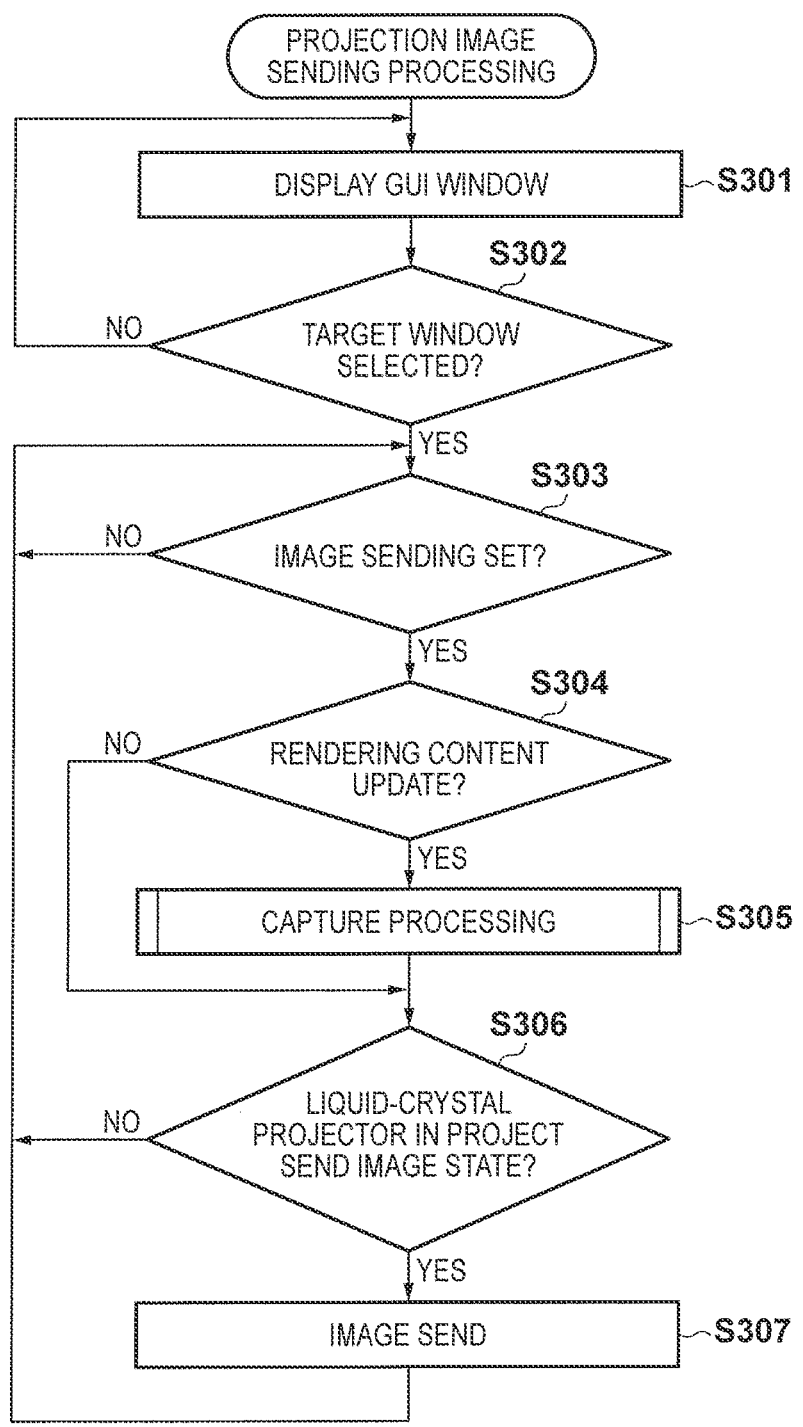
FIG. 3 is a flowchart for showing an example of projection image transmission processing executed by the PC 100 according to embodiments of the present invention.

Explanation will be given of specific processing for projection image transmission processing executed on the PC 100 of this embodiment having this kind of configuration using the flowchart of FIG. 3. The processing corresponding to this flowchart can be realized by the PC-CPU 108 reading out a corresponding processing program stored in the PC-HDD 105, for example, loading it into the PC-RAM 103, and executing it. Note, the projection image transmission processing will be explained as something that is initiated when a projection application for transmitting image data for projection through the communication network 150 is activated on the PC 100, for example.

In step S301, the PC display controller 102, under the control of the PC-CPU 108, displays a GUI window for the projection application on the PC display unit 101. The projection application of this embodiment is capable of extracting, from a display image, an image corresponding to a region of a window (target object) selected out of the windows displayed on the display area of the PC display unit 101, and transmitting it as image data for projection. The GUI window for this application may be as shown in FIG. 4, for example.

Figure 4:
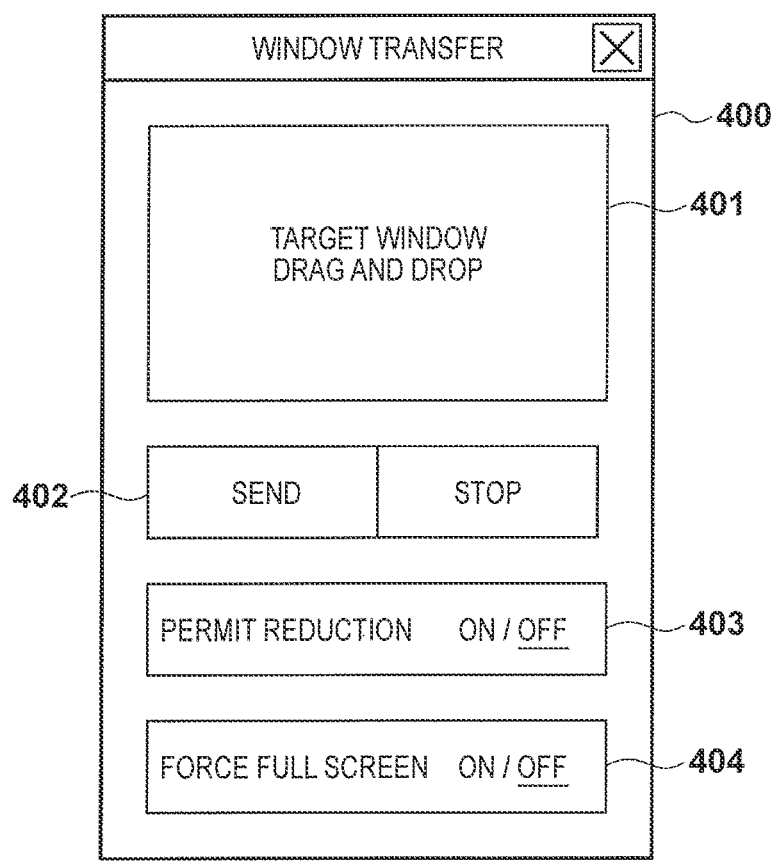
FIG. 4 is a view for showing an example of a GUI window for a projection application executed on the PC 100 according to embodiments of the present invention.

As shown in FIG. 4, a selection region 401 is arranged for selecting a window (target window) of a projection target in a GUI window 400. A user is able to make a window be a target window by dragging and dropping the window he or she wishes to make a projection target into the selection region 401 on the display area of the PC display unit 101. Also, after a target window is determined, the user is able to control the transmission and the stopping of transmission of the image corresponding to a region of the target window by operating a send/stop switching button 402. Also, the GUI window 400 includes a reduction permission button 403 for switching whether or not to permit shrinking of the target window, in cases where the target window cannot be displayed without another window overlapping the target window in the display area as will be explained later. Furthermore, the GUI window 400 includes a full screen button 404 for switching whether or not to display the target window for the full screen in the display area of the PC display unit 101 when an image corresponding to a region of the target window is transmitted.

In step S302, the PC-CPU 108 determines whether or not selection of a target window has been performed. The PC-CPU 108 moves the processing on to step S303 in cases where it determines that selection of the target window has been performed, and repeats the processing of this step in cases where it determines that selection has not been performed.

In step S303, the PC-CPU 108 determines whether or not setting has been performed for transmitting an image of a region corresponding to a target window. Specifically, the PC-CPU 108 determines whether or not the send/stop switching button 402 in the GUI window 400 is set to a send state. The PC-CPU 108 moves the processing to step S304 in cases where it determines that the setting has been performed for transmitting an image of the region corresponding to the target window, and repeats the processing of this step in cases where it is determines that the setting has not been performed.

In step S304, the PC-CPU 108 determines whether or not rendering content of the target window has been updated. In this embodiment, when the PC-CPU 108 detects, using a function of the OS, operation of a user, for example, or a timing for an automatic update of the window, it stores information indicating that rendering content of the target window has been updated into the PC-RAM 103. This information may be information of a boolean type, for example, and in this step, the PC-CPU 108 recognizes that rendering content of the target window has been updated by referencing this information. In other words, the PC-CPU 108 is capable of recognizing that an image of a region corresponding to a target window that is not captured for transmission exists. Note, in cases where, after the target window is determined, the send/pause switching button 402 is set to a send state first, information indicating that the rendering content is updated forcibly is set (set to true in the case of a boolean type). Also, in this embodiment, explanation is given having the rendering content of the target window being updated be detected using a function of the OS, but, for example, it may be considered to be updated in cases where the image transmitted to the liquid-crystal projector 200 the previous time is different to the rendering content of the current target window. The PC-CPU 108 moves the processing to step S305 in cases were it determines that the rendering content of the target window is updated, and moves the processing to step S306 in cases where it determines that the content is not updated.

In step S305, the PC-CPU 108 executes capture processing for capturing a target window for which rendering content is updated.

<Capture Processing>

Figure 5:
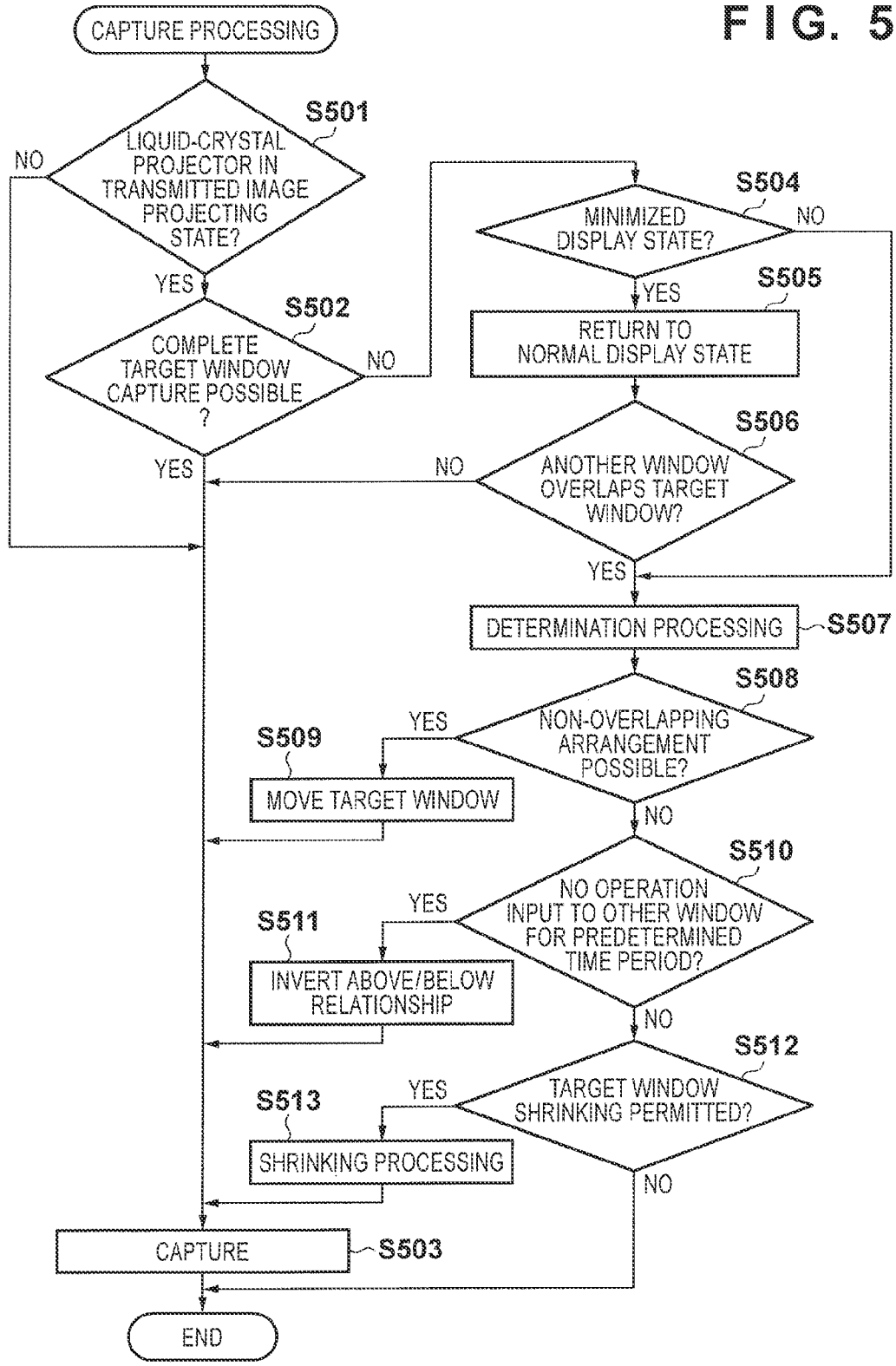
FIG. 5 is a flowchart for showing an example of capture processing executed by the PC 100 according to embodiments of the present invention.

Here, detailed explanation will be given for capture processing executed on the PC 100 of this embodiment, using the flowchart of FIG. 5.

In step S501, the PC-CPU 108 determines whether or not the liquid-crystal projector 200, which is the connection destination, is in a state for projecting images transmitted from the PC 100. Specifically, the PC-CPU 108 transmits a video input information acquisition request to the liquid-crystal projector 200 through the PC-communication unit 110 in an image transmission task. When this request is received in the liquid-crystal projector 200, the input detection unit 211 determines whether input for projection at that, point in time is set to input to the video input unit 212 or set to input received by the communication unit 201. Then, the determination result is transmitted to the PC 100 as the reply. The PC-CPU 108 discriminates a projection state of the liquid-crystal projector 200 which is the connection destination based on the received reply. The PC-CPU 108 moves the processing to step S502 in cases where the projection state of the liquid-crystal projector 200, which is the connection destination, is a state for projecting images transmitted from the PC 100, and moves the processing to step S503 in cases where it is not a state for projecting the images transmitted from the PC 100.

In step S502, the PC-CPU 108 determines whether capture of an image of a region corresponding to a target window is possible. Specifically, the PC-CPU 108 determines whether or not the image of the region corresponding to the target window is completely obtainable by obtaining the following information using functions of the OS.

a display position and a size of the target window information of a window for which a display area is included in the region corresponding to the target window, which is also displayed higher than the target window (displayed overlapping the target window).

information of whether or no the target window is minimized

Figure 6A:
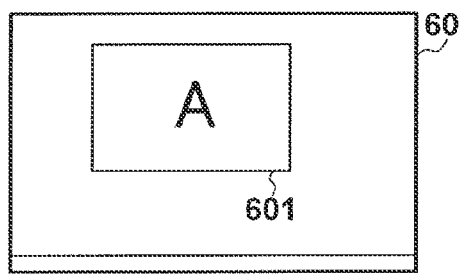
FIGS. 6A, 6B, 6C, 6D, 6E, 6F, 6G and 6H are views for explaining display control in capture processing according to embodiments of the present invention.
Figure 6B:
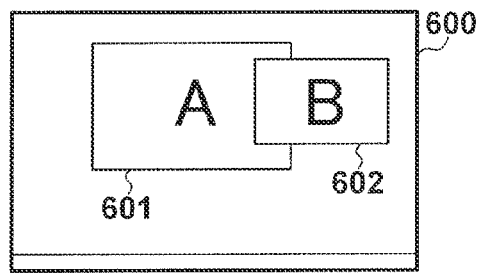

Here, due to the existence of the window displayed overlapping the target window, a state in which a region of a portion of the target window is not rendered as the display image of the PC display unit 101 is made to be a state in which the image of the region corresponding to the target window cannot be acquired at all. For example, in a case where only a target window 601 is arranged within a display area 600 as shown in FIG. 6A, the PC-CPU 108 is able to obtain the image of the region corresponding to the target window completely. However, in cases of a state in which, for example, another window 602 is arranged overlapping the target window 601 as shown in FIG. 6B, the PC-CPU 108 cannot obtain the image of the region corresponding to the target window 601 for the portion for which the overlapping occurs. Also, in a state in which the target window is minimized, because the content of the window is not rendered in the display area of the PC display unit 101, the state is such that the image of the region corresponding to the target window cannot be obtained at all in this case either. In this step, the PC-CPU 108 determines from the above described information whether or not there exists a window displayed overlapping the target window in the display area. The PC-CPU 108 moves the processing to step S503 in cases where it determines that capture of the image of the region corresponding to the target window is possible, and moves the processing to step S504 in cases where it determines that it is impossible.

In step S503, the PC-CPU 108 generates the image of the region corresponding to the target window, and completes the capture processing. Specifically, the PC-CPU 108 extracts the image of the corresponding region in accordance with information of the display position and the size of the target window from the display image loaded into the PC-VRAM 106, and stores it into the PC-RAM 103 as image data for transmission. Here, the PC-CPU 108 also stores information indicating that yet to be transmitted image data exists in the PC-RAM 103.

Meanwhile, in step S502, in cases where it determines that the image of the region corresponding to the target window is impossible to capture, the PC-CPU 108, in step S504, determines whether or not a display state of the target window is a minimized display state. The PC-CPU 108 is able to obtain information of whether or not the display state of the target window is the minimized display state using functions the OS, for example. The PC-CPU 108 moves the processing to step S505 in cases where it determines that the display state of the target window is the minimized display state, and moves the processing to step S507 in cases were it determines it is not the minimized display state.

Figure 6C:
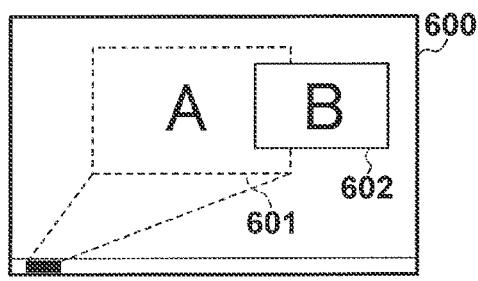

In step S505, the PC-CPU 108 returns the display state of the target window from the minimized display state to a normal state (a state displayed prior to being minimized). For example, in cases where the state displayed prior to being minimized is as in FIG. 6B, by the processing of this step, the target window 601 is restored to a state having overlapping with the other window 602 as in FIG. 6C.

In step S506, the PC-CPU 108 determines whether or not the state is such that another window overlaps the target window in the display area. The processing of this step is similar to the processing of step S502 in the projection image transmission processing. The PC-CPU 108 moves the processing to step S507 in cases where it determines that the state is such that another window overlaps the target window in the display area, and moves the processing to step S503 in cases where it determines that the state is such that there is no such overlapping.

In step S507, the PC-CPU 108 executes determination processing for determining whether it is possible to arrange the target window in the display area of the PC display unit 101 so not to be under another window. In this embodiment, the PC-CPU 108 determines by determination processing as to whether or not it is able to move only the target window within the display area and display in a state in which it does not overlap with another window. Here, there is a possibility that a user is operating another window, and there is the possibility that moving the window would obstruct the operation of the user. Specifically, this is because in cases where the arrangement of both windows are moved in order to make a display state such that another window does not overlap the target window, there is the possibility that because of the window being moved, the user operating the other window, will fail in his or her operation. However, working of the present invention is not limited to this. For example, it may be determined whether the target window is arrangeable without becoming under the other window in the display area by moving the target window, and a window higher in an above/below relationship than the target window, out of the windows within the display area.

Figure 6D:
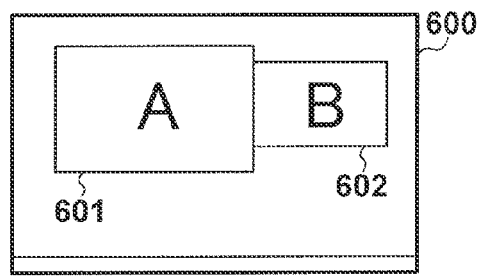

In step S508, the PC-CPU 108 determines whether or not it is possible to arrange the target window so not, to be under another window in the display area, referencing the result of the determination processing in step S507. The PC-CPU 108 moves the processing to step S509 in cases where it is possible to arrange the target window so not be under another window, and after moving the target window to a corresponding arrangement position, moves the processing to step S503, and performs a capture. For example, in cases where the display state is such that the target window 601 and the other window 602 overlap as in FIG. 6B, an arrangement position of the target window 601 is changed as in FIG. 6D in step S509. Note, a change of the display state is performed by information for screen formation being changed by a command of the PC-CPU 108, and in accordance with this information, the PC-CPU 107 rendering a corresponding screen. In the following explanation, similar processing is performed in cases where a change in the display state occurs, and so for simplicity, explanation of detailed operation is omitted.

Figure 6E:
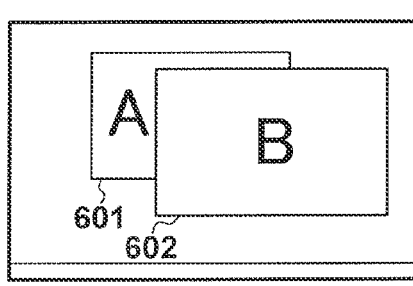
Figure 6F:
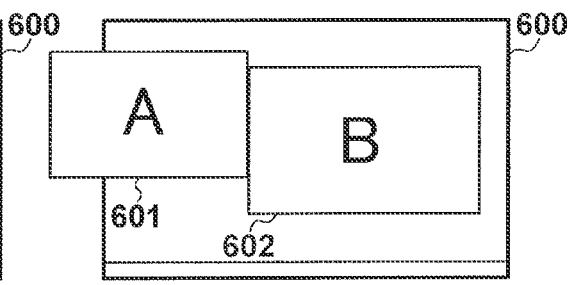

Meanwhile, the PC-CPU 108 moves the processing to step S510 in cases where it is impossible to arrange the target window without it being under the other window. In other words, in cases of a display state where the target window 601 and the other window 602 overlap as in FIG. 6E, for example, when the target window 601 is moved to positions that do not overlap, a region of a portion of the target window 601 protrudes outside of the display area 600 as in FIG. 6F. In such a case, the PC-CPU 108 moves the processing to step S510.

In step S510, the PC-CPU 108 determines whether or not user operation input has not been performed on the other window overlapping the target window for a predetermined time period. Specifically, the PC-CPU 108 performs a determination by obtaining and referencing information of an input state of a mouse input, for example, performed on the other window using a function of the OS. The PC-CPU 108 moves the processing to step S511 in cases where it determines that user operation input has not been performed in the predetermined time period on the other window, and moves the processing to step S512 in cases where it determines that input has been performed.

Figure 6G:
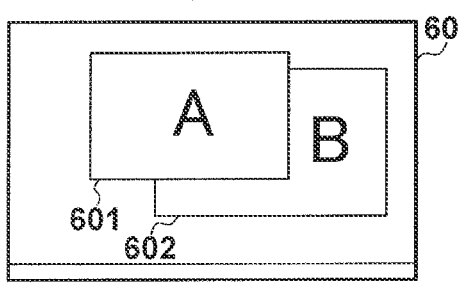

In step S511, the PC-CPU 108 inverts the above/below relationship in the display area of the target window and the other window for which it is determined that user operation input has not been performed in the predetermined time period. For example, in cases where the above/below relationship of the windows is managed by layers, the PC-CPU 108 interchanges the layers in which the two windows are managed, moves the processing to step S503, and performs the capture. For example, in cases where the target window 601 and the other window 602 are overlapping as in FIG. 6E, in this step, the PC-CPU 108 interchanges the above/below relationship of the two windows as in FIG. 6G.

Note, in this embodiment, explanation is given having the capture be performed in step S511 in cases where operation input has not been performed on the other window for a predetermined time period at the point in time when the processing of step S510 is performed, but working of the present invention is not limited to this. For example, the processing of step S511 may be performed having waited in step S510 to perform the processing in step S510 until the time period in which the operation input is not performed reaches the predetermined time period.

Meanwhile, in cases where, in step S510, it is determined that user operation input has been performed on the other window in step S512, the PC-CPU 108 determines whether or not setting to permit shrinking of the target window has been performed for the reduction permission button 403 of the GUI window 400. The PC-CPU 108 moves the processing to step S513 in cases where setting permitting the shrinking of the target window has been performed, and completes the capture processing in cases where it has not been performed.

Figure 6H:
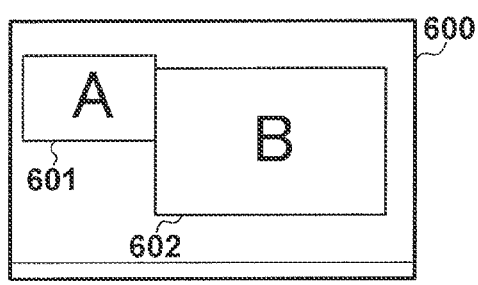

In step S513, the PC-CPU 108 changes the size of the target window to a size that is displayable in the display area without overlapping the other window, moves the processing to step S503, and performs a capture. For example, in a case where the target window 601 and the other window 602 are overlapping as in FIG. 6E, the PC-CPU 108, in this step, shrinks the size of the target window 601 to a size that fits into the display area 600 as in FIG. 6H.

In this way, by executing the capture processing, it is possible to capture the target window, whose screen content is updated, as much as possible.

In this way, after completing the capture processing, the PC-CPU 108, in step S306, determines whether or not the liquid-crystal projector 200 is in a state for projecting images transmitted from the PC 100. The PC-CPU 108 moves the processing to step S307 in cases where it determines that a mode for projecting image data transmitted from the PC 100 is set in the liquid-crystal projector 200, and returns the processing to step S303 in cases where it determines that it is not set.

In step S307, the PC-CPU 108, in cases where an image of a region corresponding to a yet to be transmitted target window exists in the PC-RAM 103, transmits the image to the liquid-crystal projector 200, and returns the processing to step S303. In the above described capture processing, there are cases where capture is impossible even when the display state of the target window is changed. However, the above described capture processing is executed in cases where the mode for projecting image data transmitted from the PC 100 is not set in the liquid-crystal projector 200 as well. For this reason, even in cases where capture is impossible, in a case where an image that was captured immediately before exists, at least that image can be transmitted to the liquid-crystal projector 200 in this step. Note, upon transmission, the PC-CPU 108 may perform predetermined processing such as coding processing for the transmitted image.

By doing this, the PC 100 of this embodiment is capable of controlling suitably a display state of a target window in the PC display unit 101, and transmitting an image of a region corresponding to the target window to the liquid-crystal projector 200.

Note, explanation was given having capture be performed having performed a change of the display state in the capture processing of this embodiment, but in cases where a mode for projecting images transmitted from the PC 100 is cancelled in the liquid-crystal projector 200, the display state may be returned to what it was prior to the change. Also, in cases where setting for transmitting an image of a region corresponding to a target window has been performed, the PC-CPU 108 may control the above/below relationship of windows so that another window is not displayed above the window.

Also, as a method of changing a display state of the window in this embodiment, both window movement and above/below relationship changing are used, but limitation is not made to this example. For example, one of either window movement or above/below relationship changing may be used, and windows that are not the display target, for example, may be minimized.

As explained above, in the image presentation system of this embodiment, an image for an object of a portion within the displayed screen can be suitably captured and transmitted, Other Embodiments Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-090788, filed Apr. 23, 2013, which is hereby incorporated by reference herein in its entirety.

What is claimed is:

1. A display controlling apparatus, comprising:
 a capturing unit configured to capture an object which is being displayed on a display unit;
 a transmission unit configured to transmit, to an image outputting apparatus, the object captured by the capturing unit;
 a selection unit configured to select a transmission object to be transmitted to the image outputting apparatus from objects that are display targets for the display unit;
 a determination unit configured to determine whether the transmission object is an output target of the image outputting apparatus;
 a storage unit configured to store an image of a region corresponding to the transmission object when rendering content of the transmission object is updated; and
 a control unit configured to control so that in a case where the determination unit determines that the transmission object is an output target of the image outputting apparatus, the transmission object is displayed with preference over another object displayed in the display unit, wherein
 the capturing unit captures the transmission object after the control by the control unit and
 the transmitting unit transmits, in a case where it is determined that the transmission object cannot be displayed with preference over another object displayed on the display unit, an image stored in the storage unit.

2. The display controlling apparatus according to claim 1, wherein the control unit controls so that the transmission object is displayed with preference over the other object by changing a layout of the objects that are display targets for the display unit.

3. The display controlling apparatus according to claim 2, further comprising a setting unit configured to set whether or not to permit a change of the layout.

4. The display controlling apparatus according to claim 1, wherein the control unit controls so that, in cases where the other object overlaps on top of the transmission object in the display unit, at least one object is moved so that the transmission object and the other object do not overlap.

5. The display controlling apparatus according to claim 1, wherein the control unit controls layers so that the transmission object is higher order than the other object.

6. The display controlling apparatus according to claim 1, wherein the control unit controls layers so that, in a case where an operation input to the other object is not performed for a predetermined time period, the transmission object is higher order than the other object.

7. The display controlling apparatus according to claim 1, wherein the control unit controls so that a size of at least one object changes so that all regions of a transmission object are included within the display area without overlapping the other object.

8. The display controlling apparatus according to claim 1, wherein the determination unit, in a case where a predetermined request is received from the image outputting apparatus, determines that the transmission object is an output target of the image outputting apparatus.

9. The display controlling apparatus according to claim 2, wherein the control unit, in a case where the transmission object is determined to not be an output target of the image outputting apparatus by the determination unit, restores a changed layout.

10. The display controlling apparatus according to claim 1, wherein the object is a window.

11. The display controlling apparatus according to claim 1, wherein the image outputting apparatus is a projector.

12. A method of controlling a display controlling apparatus, comprising:
    capturing an object which is being displayed on a display unit;
    transmitting, to an image outputting apparatus, the captured object;
    selecting a transmission object to be transmitted to the image outputting apparatus from objects that are display targets for the display unit;
    determining whether the transmission object is an output target of the image outputting apparatus;
    storing, in a storage unit, an image of a region corresponding to the transmission object when rendering content of the transmission object is updated; and
    controlling so that in a case where it is determined that the transmission object is an output target of the image outputting apparatus, the transmission object is displayed with preference over another object displayed in the display unit, wherein
    a capture of the transmission object is performed after the controlling, and
    an image stored in the storage unit is transmitted, in a case where it is determined that the transmission object cannot be displayed with preference over another object displayed on the display unit.

13. A non-transitory computer-readable recording medium on which is recorded a program for causing a computer to execute processing of:
    capturing an object which is being displayed on a display unit;
    transmitting, to an image outputting apparatus, the captured object;
    selecting a transmission object to be transmitted to the image outputting apparatus from objects that are display targets for the display unit;
    determining whether the transmission object is an output target of the image outputting apparatus;
    storing, in a storage unit, an image of a region corresponding to the transmission object when rendering content of the transmission object is updated; and
    controlling so that in a case where it is determined that the transmission object is an output target of the image outputting apparatus, the transmission object is displayed with preference over another object displayed in the display unit, wherein
    a capture of the transmission object is performed after the controlling, and
    an image stored in the storage unit is transmitted, in a case where it is determined that the transmission object cannot be displayed with preference over another object displayed on the display unit.

* * * * *